US006608541B2

(12) United States Patent
Shiraki et al.

(10) Patent No.: US 6,608,541 B2
(45) Date of Patent: Aug. 19, 2003

(54) ELECTROMAGNETIC ACTUATOR

(75) Inventors: Manabu Shiraki, Yamato (JP); Naoki Sekiguchi, Yamato (JP); Makoto Fujii, Yamato (JP); Noriyuki Washio, Yamato (JP); Katsu Okubo, Yamato (JP)

(73) Assignee: Shicoh Engineering Co., Ltd. (JP)

( * ) Notice: Subject to any disclaimer, the term of this patent is extended or adjusted under 35 U.S.C. 154(b) by 0 days.

(21) Appl. No.: 10/190,570

(22) Filed: Jul. 9, 2002

(65) Prior Publication Data

US 2003/0062978 A1 Apr. 3, 2003

(51) Int. Cl.7 .............................. H01F 7/08; H04B 3/36

(52) U.S. Cl. ........................ 335/222; 335/223; 340/7.6; 340/407.1; 381/401; 381/402

(58) Field of Search ................................ 381/396, 400, 381/401, 402, 412; 340/7.6, 407.1; 335/222, 223

(56) References Cited

U.S. PATENT DOCUMENTS 4,427,845 A * 1/1984 Yoshida ..................... 381/94.9

* cited by examiner

*Primary Examiner*—Ramon M. Barrera
(74) *Attorney, Agent, or Firm*—Lorusso, Loud & Kelly

(57) ABSTRACT

An electromagnetic actuator comprises: a magnet; a pole piece mounted to the magnet; a yoke facing the pole piece; a coil base having a vibration coil; leaf springs for supporting the coil base and a weight; a case for enclosing them; a cover for covering one side of the case; and a diaphragm having a voice coil, wherein the arms of the coil base are inserted through notches formed in the yoke, and the vibration coil and the voice coil is disposed in a gap in which the pole piece and the yoke face each other. The weight vibrates by the application of a low-frequency current to the vibration coil, and the diaphragm vibrates by the application of a high-frequency current to the voice coil.

15 Claims, 4 Drawing Sheets

ELECTROMAGNETIC ACTUATOR

BACKGROUND OF THE INVENTION

1. Field of the Invention

The present invention relates to an electromagnetic actuator, and more particularly, to an electromagnetic actuator used for mobile phones, beepers and so on for making a call at the time of signal arrival by sound or vibration.

2. Description of the Related Art

A first electromagnetic actuator disclosed in WO No. 39843/1999 is well known as this type of electromagnetic actuator. The first electromagnetic actuator is shown in FIG. 6. As shown in FIG. 6, an electromagnetic actuator 100 includes a magnet 105 in a groove of a yoke 103 in a case 101 and a coil 109 mounted to a diaphragm 107 in the groove with a gap provided between it and the magnet 105. The yoke 103 is supported by upper and lower vibration plates 111 and 113 arranged in parallel on the side of the case 101. By applying a low-frequency current to the coil 109, the yoke 103 vibrates by the action of the vibration plates 111 and 113, and by applying a high-frequency current to the coil 109, the diaphragm 107 vibrates to generate a high-frequency sound. Also, a collar 115 projects from the case 101 in the radial direction for regulating the vibration direction of the yoke 103 in the vertical direction.

A second electromagnetic actuator of the same type uses two coils for driving, which is shown in FIG. 7. As shown in FIG. 7, an electromagnetic actuator 200 includes a vibration coil 203 and a voice coil 205. The vibration coil 203 is secured to the upper collar of a case 213 and is disposed in an external gap formed between a pole piece 209 and the external wall of a yoke 210. The voice coil 205 is secured to a diaphragm 223 and is disposed in an inner gap formed between the pole piece 209 and the inner wall of the yoke 210.

An upper leaf spring 217*a* is interposed between the external wall of the yoke 210 and the upper collar of the case 213; and a lower leaf spring 217*b* is interposed between the bottom of the yoke 210 and a cover 214 and is compressed from a natural position to support the yoke 210 by sandwiching it from above and below.

A ring-shaped magnet 207 has a pole piece 209 bonded to the top thereof, the bottom of which is secured to the concave portion of the yoke 210, and the yoke 210, the magnet 207, and the pole piece 209 form a vibration body in which the total mass thereof is supported by the spring constant of the leaf springs 217*a* and 217*b*. A direction regulating member 241 projecting from a central yoke of the cover 214 acts as a shaft for regulating the movement of the yoke 210 only in a vertical direction.

When a low-frequency current is applied to the vibration coil 203 from a terminal block 213*c*, the yoke 210 vibrates and, when a high-frequency current is applied to the voice coil 205, the diaphragm 223 vibrates to generate a high-frequency sound.

Furthermore, there is a third electromagnetic actuator of the same type using two coils, which is shown in FIG. 8. As shown in FIG. 8, in a third electromagnetic actuator 300, pole pieces 309*a* and 309*b* bonded to the top and the bottom of a magnet 307, respectively, face a yoke 310; a vibration coil 303 is disposed in a lower gap portion and a voice coil 305 is disposed in an upper gap portion; and the yoke 310 is sandwiched by two leaf springs 317*a* and 317*b*.

A case 313 supports the leaf springs 317*a* and 317*b* with the inner periphery thereof, and supports a peripheral yoke of a diaphragm 323. The case 313 supports the vibration coil 303 and also supports the magnet 307 and the pole pieces 309*a* and 309*b* with a support base 315.

When a low-frequency current is applied to the vibration coil 303 from a terminal block 313*c*, the yoke 310 vibrate and, when a high-frequency current is applied to the voice coil 305, the diaphragm 323 vibrates to generate a high-frequency sound. Referring to FIG. 8, there is also provided a configuration in which a vertical midpoint of the yoke 310 and a vertical midpoint of the magnet 307 are connected with a ring-shaped arm (not shown) and the support base 315 is eliminated. With such a configuration, since the total math of the yoke 310, the magnet 307, and the pole pieces 309*a* and 309*b* acts as a vibration body, thus increasing vibration.

Also, referring to FIG. 8, there is also provided a configuration in which the yoke 310 is replaced with a combination of the ring-shaped magnet 307 and the pole pieces 309*a* and 309*b*, and the combination of the magnet 307 and the pole pieces 309*a* and 309*b* is replaced with the yoke 310. With such a configuration, the volume of the magnet 307 can be increased.

However, the art shown in FIG. 6 has problems in that since the collar 115 for regulating the direction of vibration is brought into contact with the yoke 103, stable vibration is lost, and that when a high-frequency current is applied to the coil 109 during the vibration of the yoke 103, distortion of a high-frequency sound is caused owing to a low-frequency vibration.

Also, the arts shown in FIGS. 7 and 8 have a problem in that when a low-frequency current is applied to the vibration coils 203 and 303, the yokes 210 and 310 vibrate and gaps in which the voice coils 205 and 305 are positioned also vibrate, and accordingly, when the simultaneous generation of a low-frequency vibration and a high-frequency sound is intended, distortion of the high-frequency sound is caused because of the low-frequency vibration.

SUMMARY OF THE INVENTION

Accordingly, it is an object of the present invention to provide a compact electromagnetic actuator capable of generating a high-frequency sound without distortion while ensuring stable vibration even during low-frequency vibration.

In order to achieve the above object, an electromagnetic actuator according to a first aspect of the present invention comprises a magnet; a pole piece mounted to the magnet; a yoke facing the pole piece; a coil base having a vibration coil facing the pole piece; a leaf spring for supporting the coil base and a weight disposed around the periphery of the yoke; a case for enclosing them; a cover for covering one side of the case; and a diaphragm having a voice coil, wherein arms of the coil base are inserted through notches formed in the yoke to allow the vibration coil and the voice coil to be disposed in a gap in which the pole piece and the yoke face each other; the weight vibrates by the application of a low-frequency current to the vibration coil; and the diaphragm vibrates by the application of a high-frequency current to the voice coil facing the pole piece.

In this invention, since the voice coil is positioned in a gap sandwiched by the fixed pole piece and the yoke, it can generate sound without the influence of vibration even during the vibration of the weight.

According to the present invention, preferably, in the above invention, the pole piece is composed of two pole pieces mounted on the top and the bottom of the magnet; the vibration coil is disposed in a lower gap portion in which the pole piece and the yoke face each other; and the voice coil is disposed in an upper gap portion.

This invention has similar advantages to those of the above invention and, since the vibration coil is disposed in the lower gap portion, induced interference between both coils can be reduced.

According to the present invention, preferably, in the above invention, the vibration coil and the voice coil are concentrically disposed in the gap in which the pole piece mounted on the top of the magnet and the yoke face each other.

This invention has similar advantages to those of the above invention and, since only one gap is formed, leakage flux can be reduced.

According to the present invention, preferably, in either of the above inventions, the leaf spring, which is composed of two leaf springs arranged close to each other, supports only one side of the weight.

This invention has similar advantages to those of either of the above inventions, and the fluctuation of spring constant can be reduced and the weight can be increased in mass. Thus, stable and larger vibration can be obtained.

According to the present invention, preferably, the cover and the yoke include fan-shaped notches and convex portions, respectively, which are fitted with each other in either of the above inventions.

This invention has similar advantages to those of either of the above inventions and, since the cover and the lower part of the yoke are fitted with each other, assembly accuracy can be improved.

According to the present invention, preferably, the two leaf springs are used as electric supply terminals in either of the above inventions.

This invention has similar advantages to those of either of the above inventions and, since the two leaf springs also act as electric supply terminals, the number of parts can be decreased.

According to the present invention, preferably, the coil base is a resin molding and insulates the two leaf springs from each other in either of the above inventions.

This invention has similar advantages to those of either of the above inventions and the two terminals can reliably be insulated from each other.

An electromagnetic actuator according to a second aspect of the present invention comprises: a magnet; a pole piece mounted to the magnet; a central yoke facing the pole piece at the center with a voice coil facing the pole piece sandwiched therebetween; a yoke facing the pole piece at the outer periphery with a vibration coil facing the pole piece sandwiched therebetween; a weight having the vibration coil and supported by a leaf spring; a case having the magnet and enclosing them; and a diaphragm having the voice coil, wherein a first magnetic circuit is formed from the pole piece toward the center via the central yoke and the case with an inner gap sandwiched therebetween; a second magnetic circuit is formed from the pole piece toward the outer periphery via the yoke and the case with an outer gap sandwiched therebetween; the weight vibrates by the application of a low-frequency current to the vibration coil; and the diaphragm vibrates by the application of a high-frequency current to the voice coil.

In this invention, since the voice coil is positioned in the inner gap sandwiched by the fixed pole piece and the central yoke, it can generate sound without the influence of vibration even during the vibration of the weight.

An electromagnetic actuator according to a third aspect of the present invention comprises: a magnet; a pole piece mounted to the magnet; a peripheral yoke facing the pole piece at the outer periphery with a voice coil facing the pole piece sandwiched therebetween; a yoke facing the pole piece at the center with a vibration coil facing the pole piece sandwiched therebetween; a weight having the vibration coil and supported by a leaf spring; a case having the magnet and enclosing them; and a diaphragm having the voice coil, wherein a first magnetic circuit is formed from the pole piece toward the outer periphery via the peripheral yoke and the case with an outer gap sandwiched therebetween; a second magnetic circuit is formed from the pole piece toward the center via the yoke and the case with an inner gap sandwiched therebetween; the weight vibrates by the application of a low-frequency current to the vibration coil; and the diaphragm vibrates by the application of a high-frequency current to the voice coil.

In this invention, since the voice coil is positioned in the outer gap sandwiched by the fixed pole piece and the peripheral yoke, it can generate sound without the influence of vibration even during the vibration of the weight.

According to the present invention, preferably, a direction regulating member is provided along the inner periphery of the weight to regulate the vibration direction of the weight in either of the above inventions.

This invention has similar advantages to those of either of the above inventions and, since the weight vibrates only in the vertical direction and the shock resistance of the configuration is improved.

According to the present invention, preferably, the weight is a molding produced by sintering high specific gravity powder in either of the above inventions.

This invention has similar advantages to those of either of the above inventions and the weight can be increased in mass and thus larger vibration can be obtained.

DESCRIPTION OF THE PREFERRED EMBODIMENTS

Preferred embodiments of an electromagnetic actuator according to the present invention will be specifically described hereinbelow with reference to the attached drawings.

Figure 1:
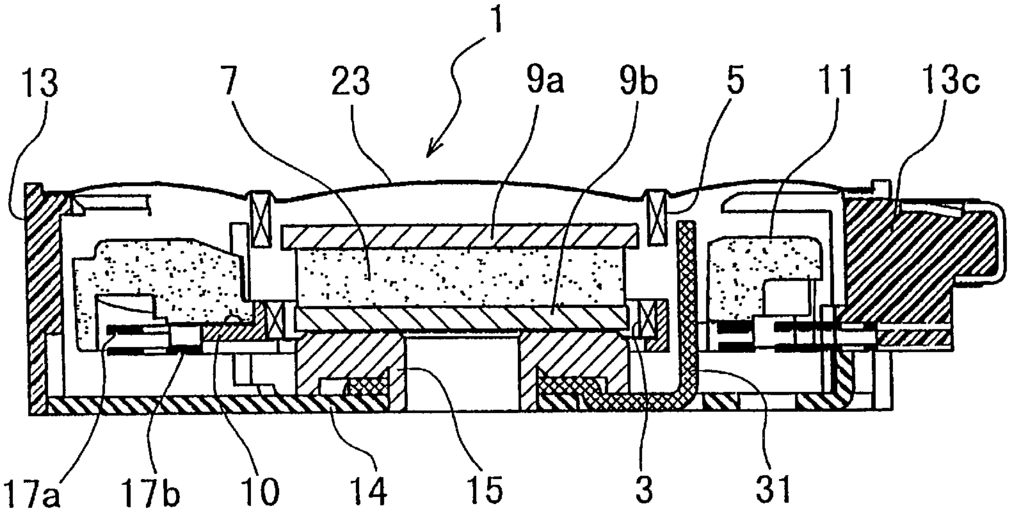
FIG. 1 is a sectional view of an electromagnetic actuator according to the present invention.
Figure 2:
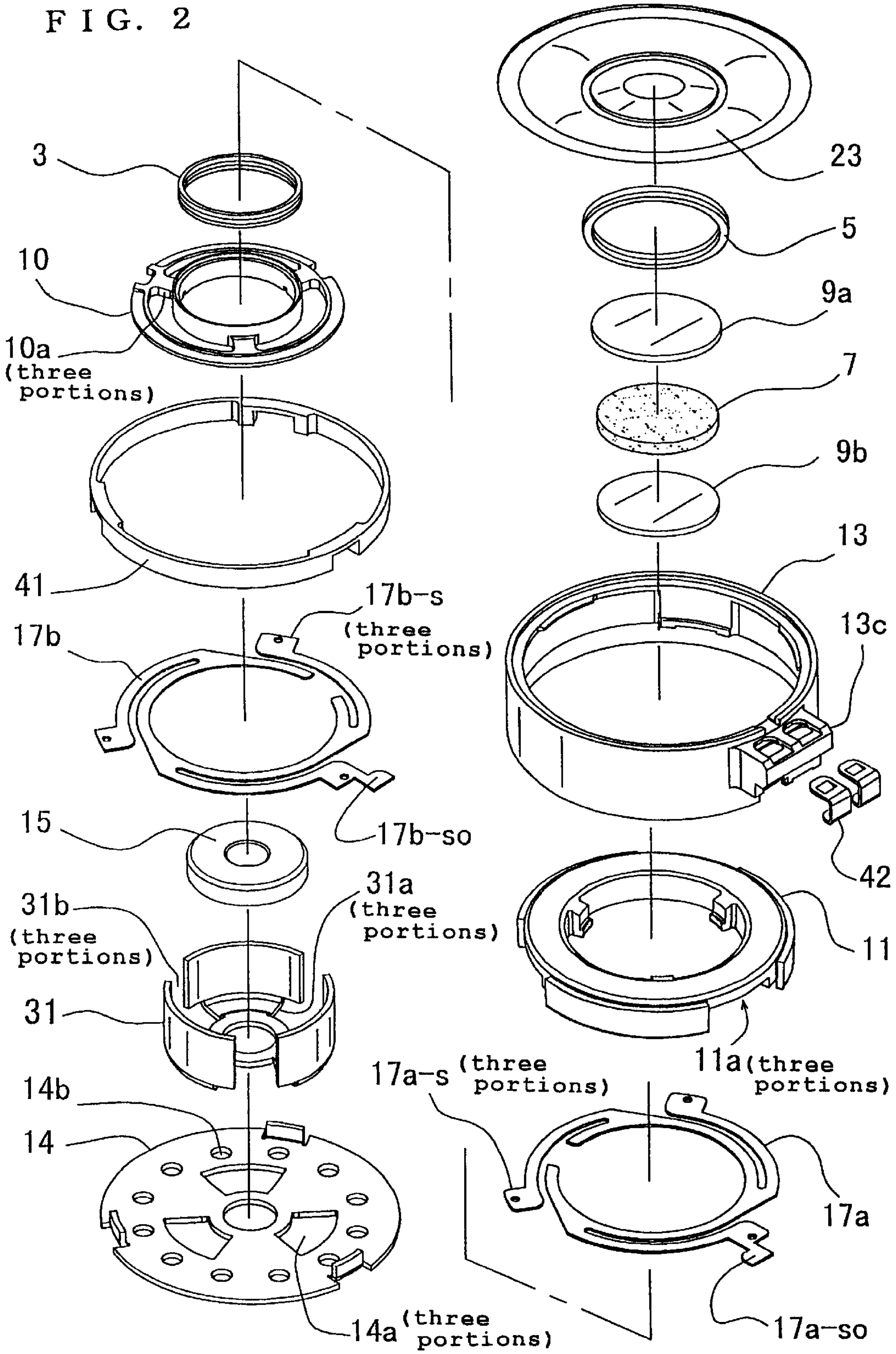
FIG. 2 is an exploded perspective view of the electromagnetic actuator in FIG. 1.

FIG. 1 is a sectional view of an electromagnetic actuator according to the present invention, and FIG. 2 is an exploded perspective view of the electromagnetic actuator in FIG. 1.

An electromagnetic actuator 1 shown in FIG. 1 makes the information that is received via a mobile phone known to a wearer with vibration or sound.

The electromagnetic actuator 1 includes: a magnet 7; pole pieces 9*a* and 9*b*; a coil base 10 having a vibration coil 3 mounted thereon; two leaf springs 17*a* and 17*b* for supporting the coil base 10 and a weight 11; a magnetic yoke 31; a case 13 for enclosing them; a cover 14 for covering one side of the case 13; a diaphragm 23 for covering the other side of the case 13; and a voice coil 5 secured to the diaphragm 23 and impressed with a high-frequency current, wherein the vibration coil 3 and the voice coil 5 are disposed in a gap between the pole pieces 9*a* and 9*b* and the yoke 31; wherein the weight 11 vibrates in the vertical direction in FIG. 1 by the application of a low-frequency current (for example, a single frequency of 150 to 170 Hz as a sensible frequency) to the vibration coil 3; and wherein the diaphragm 23 vibrates by the application of a high-frequency current (for example, a broad-band frequency of 900 to 8000 Hz as an audio frequency) to the voice coil 5, thereby generating sound. In this specification, while the words "upper" and "lower" are used for convenience, they do not specify upper and lower positions.

The case 13 is a resin molding and is engaged with the cover 14 at the side bottom, and three notches 14*a* of the cover 14 are fitted with three convex portions 31*a* of the yoke 31. The cover 14 has a plurality of holes 14*b* for releasing fluctuating internal air pressure. The case 13 has the diaphragm 23 secured to the upper part thereof, supports the two leaf springs 17*a* and 17*b* at three portions on the inner circumference, and has a terminal block 13*c* for feeding current to the vibration coil 3 and the voice coil 5. The case also has a support base 15 for supporting the magnet 7 and the pole pieces 9*a* and 9*b* at the lower center.

The magnetic yoke 31 forms a gap with the facing pole pieces 9*a* and 9*b* to form a magnetic path to the bottom of the magnet 7. The coil base 10 has arms 10*a* extending toward the center from three portions on the circumference. The arms 10*a* pass through three notches 31*b* of the yoke 31, to a ring of which the vibration coil 3 is secured.

The inner peripheries of the leaf springs 17*a* and 17*b*, respectively, are secured to the upper and lower parts on the outer periphery of the resin-molded coil base 10. The inner periphery of the upper leaf spring 17*a* is further secured to the bottom of the weight 11. The leaf springs 17*a* and 17*b* has support sections 17*a-s* and 17*b-s* at three portions on the outer periphery thereof, respectively, and are secured to the inner periphery of the case 13 together with a spring-holding member (direction regulating member) 41 made of resin. When an electromagnetic force is applied to the vibration coil 3, the coil base 10 having the weight 11 thereon vibrates in a vertical direction. Accordingly, the notches 31*b* are each provided with a vertical space corresponding to the vibration amplitude, and the weight 11 is provided with three undercuts 11*a* at the bottom in order to avoid the collision with the leaf spring 17*a*.

The resonant frequency of the vibration system obtained from the spring constant of both leaf springs 17*a* and 17*b* and the mass of the weight 11 is agreed with the frequency of low-frequency current to be applied to the vibration coil 3. The weight 11 is formed by sintering high specific gravity powder such as tungsten.

In this embodiment, since the two leaf springs 17*a* and 17*b* are arranged close to each other (with a space of about 0.1 to 0.2 mm therebetween), the stress per one leaf spring can be decreased and close setting of spring constant is allowed by using two leaf springs of different thickness. Also, since the leaf springs 17*a* and 17*b* are supported only by the bottom of the weight 11, the undercut 11*a* for avoiding collision is required only on one side, and thus the mass of the weight 11 can be maintained large and also the deformation of the spring for lateral impact can be decreased.

The diaphragm 23 is formed such that a thin film of a high molecular compound such as polyethylene is formed in a disc shape, and is bonded to the top periphery of the case 13. In order to obtain flat vibration characteristics in a broad frequency band, a plurality of grooves is formed along the tangential line of the voice coil 5 on the outer periphery.

The voice coil 5 is bonded to the lower surface of the diaphragm 23 and is arranged in a gap sandwiched by the upper pole piece 9*a* and the yoke 31. When a high-frequency current is applied, the voice coil 5 is subjected to an electromagnetic force by the action of a magnetic field of the gap. In the compact electromagnetic actuator 1, since the natural fundamental (minimum) frequency of the diaphragm 23 is as high as about 1 kHz, the current applied to the voice coil 5 is called a high-frequency current.

A lead wire for the voice coil 5 is taken out toward the outer periphery while being in contact with the lower surface of the diaphragm 23, and is connected to a contact 42 on a terminal block 13*c* via the upper end surface of the case 13. Two lead wires for the vibration coil 3 are soldered to the respective inner peripheries of the leaf springs 17*a* and 17*b* through two grooves in the arm 10*a*. One of the support sections 17*a-s* of the leaf spring 17*a* and one of the support sections 17*b-s* of the leaf spring 17*b* extend in the direction of the radius as terminal sections 17*a-so* and 17*b-so*, are secured to the lower side of the terminal block 13*c*, and act as vibration contacts. Since the case 13 and the coil base 10 are resin moldings, the leaf springs 17*a* and 17*b* serving as vibration electric supply paths are electrically insulated from each other.

The upper side (for example, the north pole) of the magnet 7 is in contact with the pole piece 9*a* and the lower side (for example, the south pole) is in contact with the pole piece 9*b*. Since the voice coil 5 is disposed at the upper part of the gap and the vibration coil 3 is disposed at the lower part, a high-frequency current is supplied to the voice coil 5 to generate sound and a low-frequency current is supplied to the vibration coil 3 to generate vibration, respectively, from within a mobile phone.

When both of the high-frequency current and the low-frequency current are simultaneously applied from within the mobile phone, the voice coil 5 can generate sound irrespective of low-frequency vibration because it is positioned in a gap sandwiched by the fixed pole piece 9*a* and the fixed yoke 31.

Subsequently, the operation of this embodiment will be described on the basis of the above-described configuration. The electromagnetic actuator 1 is assembled such that, first, the vibration coil 3, the leaf springs 17*a* and 17*b*, and the weight 11 are secured to the coil base 10, the lead wires for the vibration coil 3 are soldered to the leaf springs 17*a* and 17*b*, and then the pole pieces 9*a* and 9*b* are bonded to the upper surface and lower surface of the magnet 7, respectively. Next, the convex portions 31*a* of the yoke 31 are fitted in the notches 14*a* of the cover 14, on which the support base 15 is mounted and is fitted on the lower part of the case 13. The fitting of the notches 14*a* and the convex portions 31*a* facilitate circumferential positioning.

The respective support sections 17*a-s* and 17*b-s* of the leaf plates 17*a* and 17*b* are bonded to the inner peripheral side surface of the case 13 along with the spring holding member 41 with the arms 10*a* of the coil base 10 passed through the notches 31*b*. Subsequently, the pole piece 9*b* is bonded onto the support base 15; the diaphragm 23, to which the voice coil 5 is mounted in advance, is bonded to the upper periphery of the case 13; and at last the lead wire for the voice coil 5 is connected to the contact 42 of the terminal block 13*c*.

In the electromagnetic actuator 1, when a low-frequency current (for example, a single frequency of 150 to 170 Hz as a sensitive frequency) is applied to the vibration coil 3 from a circuit in a mobile phone, the weight 11 vibrates vertically in the drawing by the action of this low-frequency current and the magnetic field. When the weight 11 vibrates, the mobile phone fixing the case 13 vibrates to transmit information such as an incoming signal to the wearer.

When a high-frequency current (for example, a broadband frequency of 900 to 8000 Hz as an audio frequency) is applied to the voice coil 5, the diaphragm 23 vibrates at a high-frequency band by the action of this high-frequency current and the magnetic field. Since the diaphragm 23 is a vibration plate formed in a cone shape with a thin-film material such as polyethylene, it performs high-fidelity sonic radiation for the driving force at a high-frequency band via the voice coil 5. When the diaphragm 23 vibrates, high-frequency sound via the mobile phone fixing the case 13 transmits information such as an incoming signal to the wearer.

Figure 3:
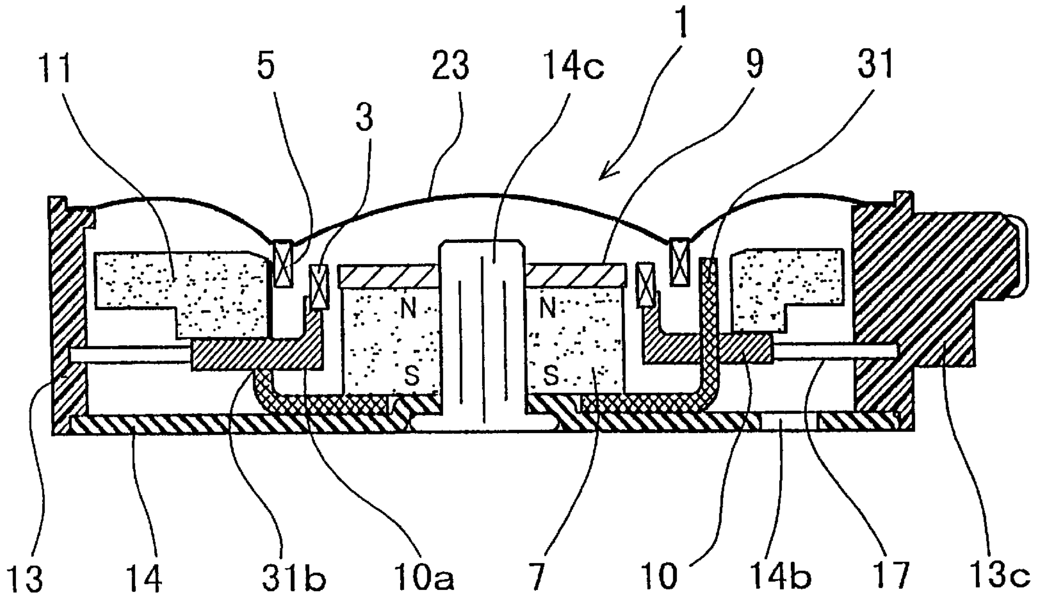
FIG. 3 is a sectional view of an electromagnetic actuator according to a second embodiment.

In this embodiment, the voice coil 5 is positioned in the gap sandwiched between the fixed pole piece 9*a* and the yoke 31, it can generate sound irrespective of the low-frequency vibration even when a high-frequency current and a low-frequency current are simultaneously applied, therefore causing no disadvantageous phenomenon that distortion in high-frequency sound occurs owing to low-frequency vibration, as in the conventional example of FIG. 3.

In this embodiment, since the two leaf springs 17*a* and 17*b* are used as electric supply paths to the vibration coil 3, reliable electric supply can be performed irrespective of the vibration amplitude of the weight 11. Also, the outermost peripheries of the leaf springs 17*a* and 17*b* are used as contacts 17*a-so* and 17*b-so*, the reliability can be improved and the number of parts can be reduced.

Furthermore, in this embodiment, the resin-molded coil base 10 firmly connects the weight 11 with the vibration coil 3, thus insulating electrically conductive weight 11 and the vibration coil 3 from each other and also insulating both leaf springs 17*a* and 17*b* from each other, and supporting the circumference of the vibration coil 3. Therefore, the vibration applied to the vibration coil 3 can be transmitted to the weight 11 via the coil base 10 unchanged.

Subsequently, while other embodiments will be described, elements similar to those described above are given the same reference numerals and descriptions thereof will be omitted.

FIG. 3 is a sectional view of an electromagnetic actuator according to a second embodiment. In the second embodiment, as shown in FIG. 3, one pole piece 9 is secured on the top of the magnet 7 and forms a gap between it and the yoke 31, in which the voice coil 5 and the vibration coil 3 are concentrically disposed. Also, the yoke 31 is secured on the cover 14 and the lower side (for example, the south pole) is bonded to the bottom of the yoke 31. A central yoke 14*c* is fitted in the central yoke of the cover 14 and passes through the central yokes of the magnet 7 and the pole piece 9.

A leaf spring 17 is disposed between the bottom of the coil base 10 and the side of the case 13, as in FIG. 1. The coil base 10 secures (bonds) the vibration coil 3 on the arms 10*a* extending toward the center, and the arms 10*a* pass through the notches 31*b*. The coil base 10 is configured such that the arms 10*a* extend upward to dispose the vibration coil 3 in the gap shown in FIG. 3.

The voice coil 5 is secured directly to the diaphragm 23, and the circumferential space of the gap is larger than that of FIG. 1. Since there is no need to provide the support base 15, the thickness (the distance between the north pole and the south pole) of the magnet 7 can be increased.

From within a mobile phone, when a high-frequency current is supplied from the terminal block 13*c* disposed on the side of the case 13, the diaphragm 23 vibrates to generate sound, and when a low-frequency current is supplied to the vibration coil 3, the weight 11 vibrates to notify the wearer of incoming information.

Accordingly, also in this second embodiment, the voice coil 5 is positioned in the gap sandwiched by the fixed pole piece 9 and the magnetic yoke 31, and thus even when a high-frequency current and a low-frequency current are simultaneously applied, no disadvantageous phenomenon of causing distortion in high-frequency sound occurs.

Also, in this embodiment as well, since the leaf spring 17 is composed of two leaf springs arranged close to each other and supports only the bottom of the weight 11, strong vibration can be obtained. Also, it works as an electric supply path to the vibration coil 3, improving reliability and achieving downsizing. Furthermore, the bottoms of the cover 14 and the yoke 31 are assembled such that they are fit to each other with the notches while positioning, and the resin-molded coil base 10 reliably insulates both leaf springs from each other.

In this embodiment, since only one gap is formed, leakage flux can be decreased and also the thickness of the magnet 7 can be increased. Also, the central yoke 14*c* allows assembly in which radial positional accuracy is maintained.

Figure 4:
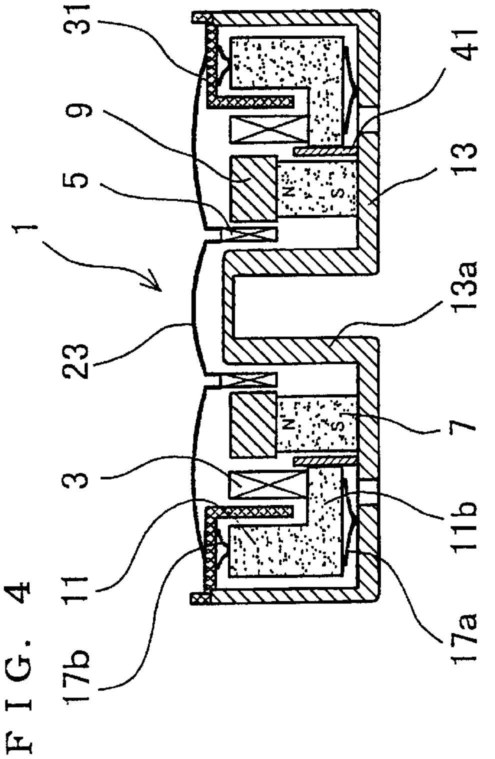
FIG. 4 is a sectional view of an electromagnetic actuator according to a third embodiment.
Figure 6:
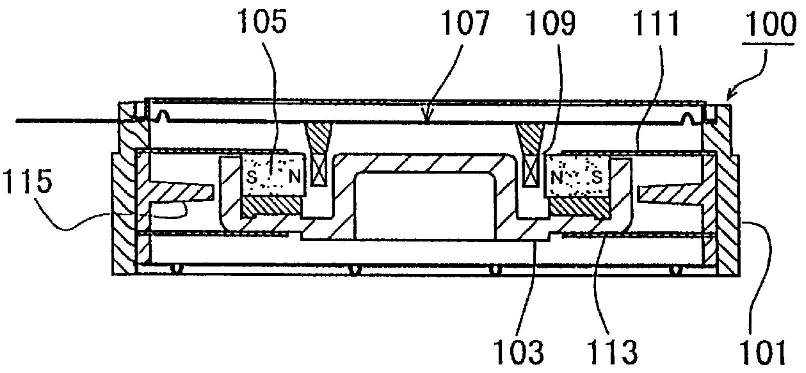
FIG. 6 RELATED ART
FIG. 6 is a sectional view of a first electromagnetic actuator according to the conventional art.
Figure 7:
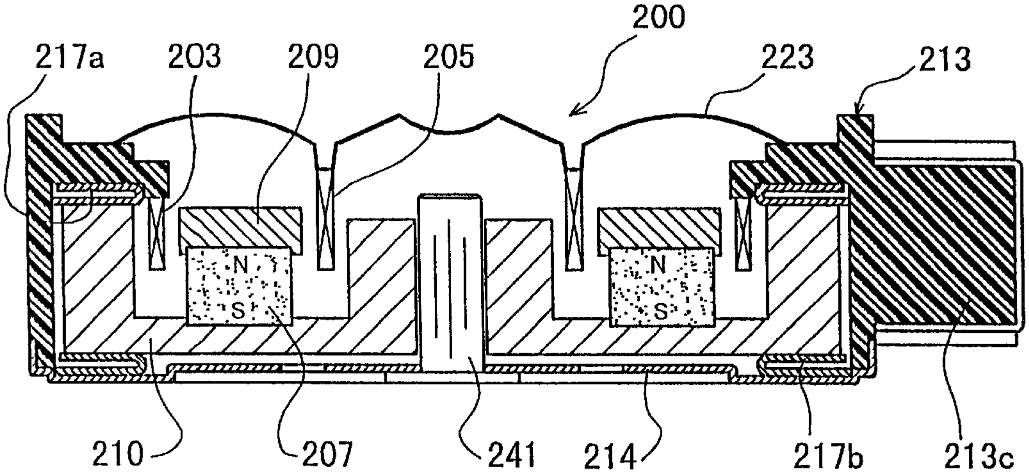
FIG. 7 RELATED ART
FIG. 7 is a sectional view of a second electromagnetic actuator according to the conventional art.
Figure 8:
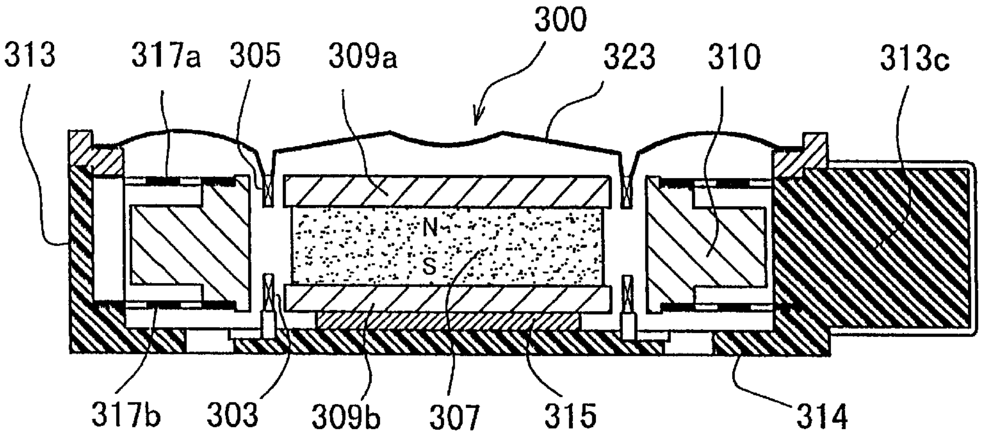
FIG. 8 RELATED ART
FIG. 8 is a sectional view of a third electromagnetic actuator according to the conventional art.

FIG. 4 is a sectional view of an electromagnetic actuator according to a third embodiment. In the third embodiment, as shown in FIG. 4, the ring-shaped magnet 7 and the ring-shaped pole piece 9 are disposed between the voice coil 5 and the vibration coil 3, and the voice coil 5 is disposed in a gap inside the ring-shaped magnet 7 and the vibration coil 3 is disposed in a gap outside thereof.

In the outer gap, the pole piece 9 and the ring-shaped yoke 31 face each other with the vibration coil 3 sandwiched therebetween. The case 13 is made of a magnetic material, the outer peripheral upper end of which is secured (bonded) to the outer periphery of the yoke 31, and the lower side (for example, the south pole) of the magnet 7 is bonded to the bottom of the case 13. Accordingly, a magnetic path is formed from the upper side (for example, the north pole) of the magnet 7 through the pole piece 9, the outer gap, the yoke 31, and the case 13, to the lower side of the magnet 7.

In the inner gap, the magnetic case 13 is provided with a central yoke 13*a* projecting therefrom, and a magnetic path is similarly formed from the pole piece 9 to the lower side of the magnet 7 through the central yoke 13*a*.

The ring-shaped weight 11 has a support section 11*b* extending from the lower part thereof toward the center, on which the vibration coil 3 is bonded. The leaf spring 17*a* is interposed between the lower surface of the weight 11 and the bottom of the case 13, and the leaf spring 17*b* is interposed between the upper surface of the weight 11 and the lower surface of the yoke 31, wherein the leaf springs

17*a* and 17*b* are compressed from a natural position to support the weight 11 by sandwiching it from top and bottom.

A direction regulating member 41 is secured (bonded) to the bottom of the case 13 and is disposed along the inner periphery of the support section 11*b* of the weight 11 to regulate the motion of the weight 11 only in the vertical direction. When a high-frequency current is supplied from a mobile phone to the voice coil 5, the diaphragm 23 vibrates to generate sound, and when a low-frequency current is supplied to the vibration coil 3, the weight 11 vibrates vertically to notify the wearer of incoming information.

Accordingly, in this third embodiment as well, the voice coil 5 is positioned in the inner gap sandwiched by the fixed pole piece 9 and the central yoke 13*a*, and thus even when the high-frequency current and the low-frequency current are simultaneously applied, no disadvantageous phenomenon of causing distortion in high-frequency sound occurs.

In this embodiment, since the circumferences of the yoke 31 and the central yoke 13*a* face the gap without a notch, leakage flux can be reduced. Furthermore, in this embodiment, since the magnetic case 13 is used for forming a magnetic path, the structure can be simplified. In addition, since the weight 11 is large in diameter, the mass of the vibration member is increased, thus increasing the vibration.

Figure 5:
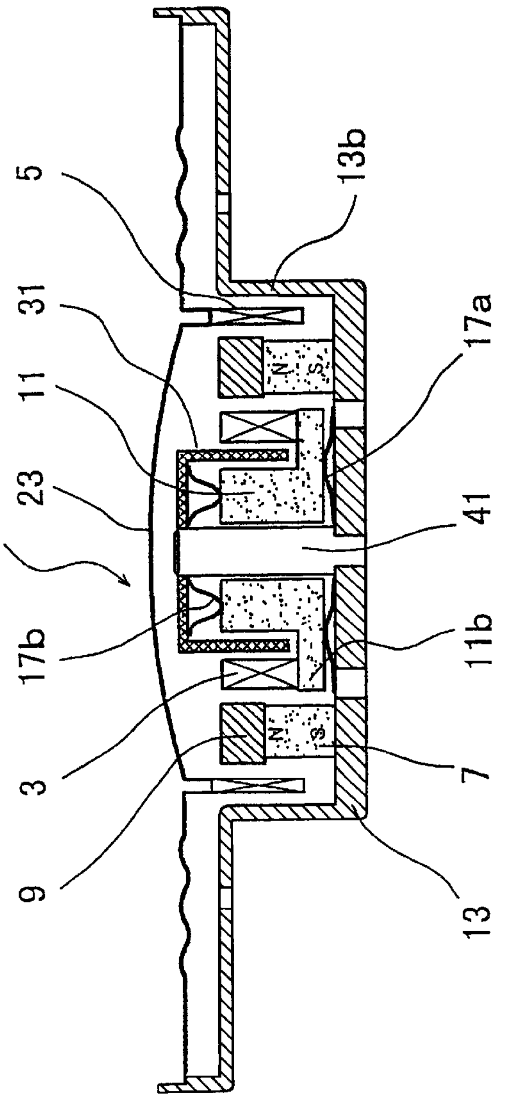
FIG. 5 is a sectional view of an electromagnetic actuator according to a fourth embodiment.

FIG. 5 is a sectional view of an electromagnetic actuator according to a fourth embodiment. In the forth embodiment, as shown in FIG. 5, the voice coil 5 is disposed on the outer periphery side of the pole piece 9 and the magnet 7. On the inner periphery side is disposed the yoke 31, the weight 11, and the direction regulating member 41 with the vibration coil 3 sandwiched therebetween. The yoke 31 is bent toward the center above the inner gap, and is secured (bonded) to the magnetic direction-regulating member 41 to form a magnetic path. A peripheral yoke 13*b* of the case 13 faces the pole piece 9 to form an outer gap therebetween.

The upper and lower leaf springs 17*b* and 17*a*, respectively, are interposed between the yoke 31 and the weight 11, and the weight 11 and the bottom of the case 13, as in FIG. 4. The weight 11 has the vibration coil 3 secured (bonded) onto the support section 11*b* extending therefrom toward the outer periphery. In other words, in the configuration of FIG. 5, in principle, the center and the outer periphery are reversed to FIG. 4.

Therefore, also in this four embodiment, the voice coil 5 is positioned in the outer gap sandwiched by the fixed pole piece 9 and the peripheral yoke 13*b* of the magnetic case 13, and thus, even when a high-frequency current and a low-frequency current are simultaneously applied, no phenomenon of generating distortion in high-frequency sound occurs.

In this embodiment, the direction regulating member 41 is made of a magnetic material, the top of which is in contact with the yoke 31, and the bottom of which is in contact with the bottom of the case 13 to thereby form a magnetic path, and works as a shaft for the weight 11. Therefore, the weight 11 can be slid in the axial direction of the direction regulating member 41. Providing the direction regulating member 41 increases shock resistance and regulates the vibrating direction of the weight 11 to an axial direction.

In this embodiment too, since the circumferences of the yoke 31 and the peripheral yoke 13*b* face the gap, leakage flux can be reduced, and since the case 13 is made of a magnetic material, the structure can be simplified.

Furthermore, in this embodiment, since the voice coil 5 can be increased in diameter, the driving radius for the diaphragm 23 can be increased, and thus the frequency band of sound generation can be increased.

According to the present invention, high-frequency sound can be generated without distortion even during low-frequency vibration.

According to the present invention, similar advantages to that of the above invention can be provided and also the interference between the coils can be decreased.

According to the present invention, similar advantages to that of the above invention can be provided and also leakage flux can be decreased.

According to the present invention, similar advantages to that of either of the above inventions can be provided and also stable and large vibration can be obtained.

According to the present invention, similar advantages to that of the above invention can be provided and also downsizing can be achieved.

According to the present invention, similar advantages to that of the above invention can be provided; reliability can be improved; and downsizing can be achieved.

According to the present invention, similar advantages to that of the above invention can be provided and also the reliability of insulation can be improved.

According to the present invention, sound generation can be performed without the influence of vibration; leakage flux can be decreased; and larger vibration can be obtained.

According to the present invention, sound generation can be performed without the influence of vibration; leakage flux can be increased, and the frequency band of sound generation can be increased.

According to the present invention, similar advantages to that of either of the above inventions can be provided and also the shock resistance of the structure can be improved.

According to the present invention, similar advantages to that of either of the above inventions can be provided and also larger vibration can be obtained.

What is claimed is:

1. An electromagnetic actuator comprising: (a) a magnet; (b) a pole piece mounted on the magnet; (c) a yoke facing the pole piece; (d) a coil base having a vibration coil facing the pole piece mounted thereon; (e) a leaf spring supporting the coil base; (f) a weight disposed around the periphery of the yoke and supported by the leaf spring, said weight vibrating responsive to excitation of the vibration coil; (g) a voice coil facing the pole piece; (h) a case enclosing (a) through (g); (i) a cover covering one side of the case; and (j) a diaphragm which vibrates responsive to excitation of the voice coil, wherein the arms of the coil base are inserted through notches formed in the yoke, the vibration coil and the voice coil being disposed in a gap between the pole piece and a face of the yoke.

2. The electromagnetic actuator according to claim 1, wherein the pole piece is formed of two pieces mounted on opposing sides of the magnet;

the vibration coil is disposed within the gap at one end of the gap; and the voice coil is disposed within the gap at another end of the gap.

3. The electromagnetic actuator according to claim 1, wherein the vibration coil and the voice coil are concentrically disposed in the gap.

4. The electromagnetic actuator according to claim 1, wherein two leaf springs support only one side of the weight.

5. The electromagnetic actuator according to claim 1, wherein the cover and the yoke are provided with fan-shaped notches and projections which are fitted to each other.

6. The electromagnetic actuator according to claim 4, wherein the two leaf springs are used as electric supply terminals.

7. The electromagnetic actuator according to claim 6, wherein the coil base is a resin molding and insulates the two leaf springs from each other.

8. The electromagnetic actuator according to claim 1, wherein the weight is a molding produced by sintering high-specific gravity powder.

9. The electromagnetic actuator according to claim 1 wherein the diaphragm closes a second side of the case, opposite the cover.

10. An electromagnetic actuator comprising: (a) a magnet; (b) a pole piece mounted on the magnet; (c) a central yoke facing the pole piece and defining an inner gap therebetween; (d) a voice coil mounted within the inner gap; (e) an outer yoke facing the pole piece and defining an outer gap therebetween; (t) a vibration coil mounted within the outer gap; (g) a weight which vibrates responsive to excitation of the vibration coil; (h) a leaf spring supporting said weight; (i) a case enclosing (a) through (h); and (j) a diaphragm which vibrates responsive to excitation of the voice coil, wherein a first magnetic circuit is formed from the pole piece toward the center via the central yoke and the case with the inner gap therebetween; and a second magnetic circuit is formed from the pole piece toward the outer periphery via the outer yoke and the case with the outer gap therebetween.

11. The electromagnetic actuator according to claim 10, wherein a direction regulating member is provided along the inner periphery of the weight to regulate the direction of vibration of the weight.

12. The electromagnetic actuator according to claim 10, wherein the diaphragm closes one side of the case.

13. An electromagnetic actuator comprising: (a) a magnet; (b) a pole piece mounted on the magnet; (c) a peripheral yoke facing the pole piece around the outer periphery of the pole piece and defining an outer gap therebetween; (d) a voice coil facing the pole piece and mounted within the outer gap; (e) a center yoke facing an inner peripheral surface of the pole piece and defining an inner gap therebetween; (f) a vibration coil facing the pole piece and mounted within the inner gap; (g) a weight which vibrates responsive to excitation of the vibration coil; (h) a leaf spring supporting the weight; (i) a case supporting the magnet and enclosing (a) through (h); and (j) a diaphragm which vibrates responsive to excitation of the voice coil, wherein a first magnetic circuit is formed from the pole piece toward the outer periphery via the peripheral yoke and the case with the outer gap sandwiched therebetween; and a second magnetic circuit is formed from the pole piece toward the center via the center yoke and the case with the inner gap sandwiched therebetween.

14. The electromagnetic actuator according to claim 13, wherein a direction regulating member is provided along the inner periphery of the weight to regulate the direction of vibration of the weight.

15. The electromagnetic actuator according to claim 13, wherein the diaphragm closes one side of the case.

* * * * *

UNITED STATES PATENT AND TRADEMARK OFFICE

CERTIFICATE OF CORRECTION

PATENT NO. : 6,608,541 B2
DATED : August 19, 2003
INVENTOR(S) : Shiraki et al.

It is certified that error appears in the above-identified patent and that said Letters Patent is hereby corrected as shown below:

Title page,
Item [56], References Cited, insert the following:
-- FOREIGN APPLICATION PRIORITY DATA
Sept. 28, 2001 (JP) 2001-338759
Dec. 11, 2001 (JP) 2001-402629
Feb. 15, 2002 (JP) 2002-82128 --.

Column 11,
Line 22, "(t)" should read -- (f) --.

Signed and Sealed this

Sixth Day of April, 2004

JON W. DUDAS
*Acting Director of the United States Patent and Trademark Office*